(12) United States Patent
Baroudi et al.

(10) Patent No.: US 9,794,808 B2
(45) Date of Patent: Oct. 17, 2017

(54) ROUTE REPAIR OF AD HOC ON-DEMAND DISTANCE VECTOR ROUTING PROTOCOL IN A WIRELESS SENSOR NETWORK

(71) Applicant: KING FAHD UNIVERSITY OF PETROLEUM AND MINERALS, Dhahran (SA)

(72) Inventors: Uthman Baroudi, Dhahran (SA); Emad Ahmad Aldalu, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 79 days.

(21) Appl. No.: 15/045,925

(22) Filed: Feb. 17, 2016

(65) Prior Publication Data

US 2017/0238197 A1    Aug. 17, 2017

(51) Int. Cl.
*H04W 24/04* (2009.01)
*H04W 84/18* (2009.01)
*H04L 12/721* (2013.01)

(52) U.S. Cl.
CPC ............. *H04W 24/04* (2013.01); *H04L 45/34* (2013.01); *H04W 84/18* (2013.01)

(58) Field of Classification Search
None
See application file for complete search history.

(56) References Cited

U.S. PATENT DOCUMENTS

| 9,125,142 B2* | 9/2015 | Hirata | H04W 48/16 |
| 9,204,363 B2* | 12/2015 | Zheng | H04L 45/34 |
| 2005/0157749 A1* | 7/2005 | Lee | H04L 29/06 |
| | | | 370/466 |

FOREIGN PATENT DOCUMENTS

CN    101436997 B    6/2011

OTHER PUBLICATIONS

Gong, Energy harvesting aware routin protocol for wiereless sensor networks, IEEE.*
C. Perkins, et al. "Ad hoc On-Demand Distance Vector (AODV) Routing" Nokia Research Center, Jul. 2003, pp. 1-31.
J. Jain, et al. "On Demand Local Link Repair Algorithm for AODV Protocol" International Journal of Computer Applications (0975-8887) vol. 35—No. 5, Dec. 2011, pp. 20-25.

(Continued)

*Primary Examiner* — Vinncelas Louis
(74) *Attorney, Agent, or Firm* — Oblon, McClelland, Maier & Neustadt, L.L.P.

(57) ABSTRACT

Systems and methods include a WSN having sensor nodes that are configured with electronic circuitry for interfacing with one or more associated sensors. The WSN also includes a gateway sensor node configured to receive sensor data from and forward instructions to the one or more sensor nodes, and a server configured to control the WSN in combination with the gateway sensor node. The WSN also includes circuitry configured to recognize a link break within a data communication route of the WSN via a routing protocol, and buffer incoming packets from a source node. The circuitry is also configured to propagate a RERR message of the link break to the plurality of sensor nodes, and build a bypass route around the link break of the data communication route towards a destination node. The circuitry is also configured to send the buffered incoming packets to the destination node through the bypass route.

17 Claims, 16 Drawing Sheets

(56) References Cited

OTHER PUBLICATIONS

C.Bhalodia, et al. "Modified Route Maintenance in AODV Routing Protocol: A Review" International Journal of Advanced Research in Computer Science and Software Engineering, vol. 4, Issue 1, Jan. 2014, pp. 1239-1241.

C.Perkins, et al. "Ad-hoc On-Demand Distance Vector Routing" https://www.cs.cornell.edu/people/egs/615/aodv.pdf, pp. 1-11.

A.Alshanyour, et al. "Bypass AODV: improving performance of ad hoc on-demand distance vector (AODV) routing protocol in wireless ad hoc networks" Research Gate, Feb. 2008, pp. 1-9.

\* cited by examiner

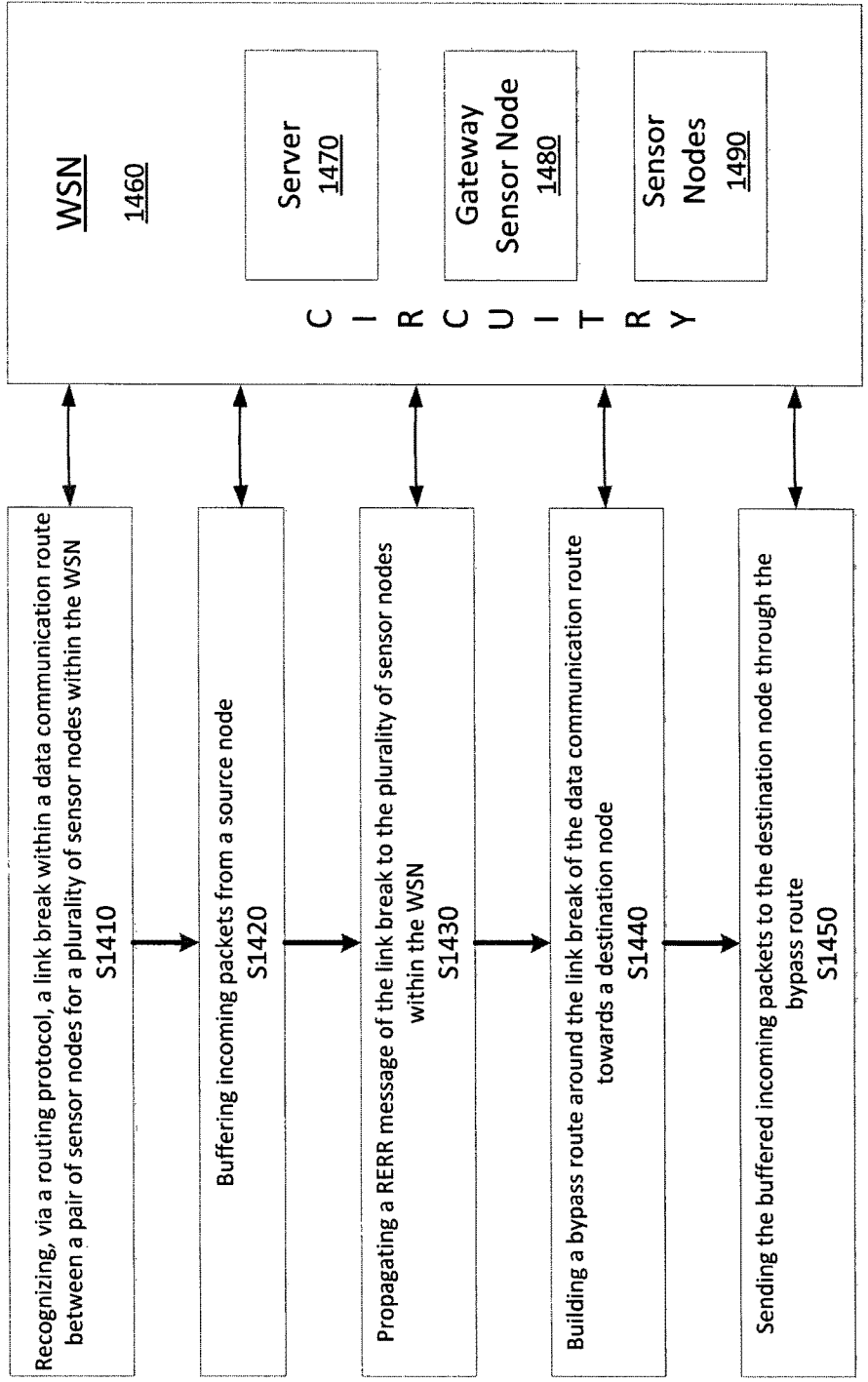

ROUTE REPAIR OF AD HOC ON-DEMAND DISTANCE VECTOR ROUTING PROTOCOL IN A WIRELESS SENSOR NETWORK

BACKGROUND

Several protocols can be used in an Ad Hoc On-Demand Distance Vector (AODV) routing protocol to accommodate interruptions in a communication path within a Wireless Sensor Network (WSN). Some routing protocols implement solutions to a flooding problem in on-demand routing protocols by enhancing route recovery mechanisms.

In AODV with Backup Routing (AODV-BR), nodes overhear route reply messages of their neighbors to create their own alternate routes to a destination. When a node detects a broken route, it broadcasts a packet concerning the broken route to its neighbors in case one of them has a valid route to the destination. At the same time, the node sends a route error (RERR) message to the source to initiate a route rediscovery. One reason for reconstructing a new route instead of continuously using the alternate path is to build a fresh and optimal route that reflects the current status of the network. AODV-BR concentrates on increasing route reliability by decreasing packet drop rates, but it suffers from problems with stale routes and duplicate packet transmission.

In Neighborhood-aware Source Routing (NSR) protocol, each node has a partial topology that covers the links in requested paths to destinations, in addition to the 2-hop neighborhood. See Spohn, M. and Garcia-Luna-Aceves, J. J. 2001. Neighborhood aware source routing, in Proceedings of $2^{nd}$ ACM International Symposium on Mobile Ad Hoc Networking and Computing (MobiHoc), incorporated herein by reference in its entirety. Link state information is maintained by broadcasting periodic HELLO messages. In case of a route failure, an intermediate node tries to repair the route if either the link to the next hop has failed or the link headed by the next hop on the path to be traversed has failed. The RERR message is propagated to the source node if an intermediate node uses a completely new route to the destination or it has no alternate route to the destination. HELLO messages in NSR protocol incur excessive overhead to maintain the partial topology of the network. In addition, stale route problems may affect the performance of NSR protocol.

Dynamic Source Routing (DSR) protocol can be suitable for networks with relatively small diameters and in which the mobile nodes move at a moderate speed with respect to packet transmission latency. It potentially caches multiple routes to a destination and provides a route salvaging option that enables intermediate nodes to recover from route failure locally by searching for an alternate route. Even with successful salvaging, intermediate nodes immediately send a RERR message back to the source to notify it about a route failure. The source node can check its cache for another valid route. If such a route is found, route reconstruction does not need to be invoked. If there are no additional routes to the destination in the source node's cache, route discovery is reinitiated. However, DSR protocol is not scalable to large networks. In addition, the failure may occur far away from the sender and close to the destination and with no alternate routes available. When the packet has succeeded in traversing most of the path, this length of successful path traversal is not exploited. This increases the overall packet delivery time and the network resources used by the routing protocol. Furthermore, DSR protocol incurs more packet drop and delay due to its dependency on stale routes.

Bypass routing is a local recovery protocol that attempts to reduce the frequency of route request floods triggered by broken routes, by localizing the reaction to route failures using on-demand local recovery and a cache-invalidation mechanism. The mechanism uses link-state information to find a patch between one of the neighbors and a node along the route to the destination. This mechanism is suitable for source routing protocols where complete route information is stored for each route entry. When a link between two nodes is broken, the node that detects the failure tries to patch the route by looking for a bypass route which connects the node with any of the downstream nodes of the broken route. If such a route is unavailable, the node triggers a local query to its neighbors to see if one of them has a valid route to any of the downstream nodes of the broken link. If neither the intermediate node nor its neighbors has an alternate route, the bypass routing is equivalent to DSR protocol, but with further overhead and delay increases. Bypass routing does not propose any solution for the stale route problem that exists in DSR protocol. Furthermore, bypass routing is only applicable to on-demand routing protocols where complete route information is included in the transmitted data packet.

Multipath routing provides fault tolerance by caching multiple routes to a destination in a single route-discovery cycle. When a link breaks, an alternative route can be used to route the packets. Although multipath processes utilize network resources, they incur more packet drop and delay due to their dependency on stale routes. On the other hand, local repair processes introduce a special route maintenance method to repair broken routes. In AODV routing protocol, the upstream node decides either to repair the route via a limited broadcast or to send a RERR message to the source node based on its distance from the destination node when a link in the route breaks. To repair the broken route, if the node is close to the destination, it sends a route request (RREQ) message with a limited time-to-live (TTL) value. Otherwise, the RERR message is propagated to the source node to start a new route discovery process. After starting the repair process, the node waits for a discovery period. If the repair attempt fails, a RERR message is sent back to the source node. Otherwise, the node updates its routing entry. Local repair processes use a large bandwidth. Even with a limited broadcast, flooding can deliver the RREQ messages to a large number of nodes, leading to high routing overheads. In addition, a route maintained by a local repair process may no longer be the optimal route at a future time. In AODV routing protocol, local repair schemes also lack an efficient way to handle link breaks that are close to the source node. Those route breaks are handled by propagating a RERR message to the source node to start a new route discovery cycle, which leads to further packet drop and bandwidth consumption. Results indicate more than 50% of route failures are close to the source side than to the destination side.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

SUMMARY

An embodiment includes a WSN having a plurality of sensor nodes that are configured with a radio transceiver and electronic circuitry for interfacing with one or more associated sensors. The WSN also includes a gateway sensor node configured to receive sensor data from and forward instructions to the one or more sensor nodes, and a server configured to control the WSN in conjunction with the gateway sensor node. The WSN also includes circuitry configured to recognize a link break within a data communication route of the WSN via a routing protocol, and buffer incoming packets from a source node. The circuitry is also configured to propagate a RERR message of the link break to the plurality of sensor nodes within the WSN, and build a bypass route around the link break of the data communication route towards a destination node. The circuitry is also configured to send the buffered incoming packets to the destination node through the bypass route.

Another embodiment includes a method of repairing a communication route in a WSN, which includes recognizing via a routing protocol, a link break within a data communication route between a pair of sensor nodes for a plurality of sensor nodes within the WSN, and buffering incoming packets from a source node. The method also includes propagating a RERR message of the link break to the plurality of sensor nodes within the WSN, and building a bypass route around the link break of the data communication route towards a destination node. The method also includes sending the buffered incoming packets to the destination node through the bypass route. The WSN includes circuitry configured to execute steps of the method, the plurality of sensor nodes are configured with a radio transceiver and circuitry for interfacing with one or more associated sensors, a gateway sensor node is configured to receive sensor data from and forward instructions to the one or more sensor nodes, and a server is configured to control the WSN in conjunction with the gateway sensor node.

Another embodiment includes a non-transitory computer-readable medium having computer-readable instructions embodied thereon, that when executed by a computing device, performs a method of repairing a communication route in a WSN. The method includes recognizing, via a routing protocol, a link break within a data communication route between a pair of sensor nodes for a plurality of sensor nodes within the WSN, and buffering incoming packets from a source node. The method also includes propagating a RERR message of the link break to the plurality of sensor nodes within the WSN, and building a bypass route around the link break of the data communication route towards a destination node. The method also includes sending the buffered incoming packets to the destination node through the bypass route. The WSN includes circuitry configured to execute steps of the method, the plurality of sensor nodes are configured with a radio transceiver and circuitry for interfacing with one or more associated sensors, a gateway sensor node is configured to receive sensor data from and forward instructions to the one or more sensor nodes, and a server is configured to control the WSN in conjunction with the gateway sensor node.

The foregoing paragraphs have been provided by way of general introduction, and are not intended to limit the scope of the following claims. The described embodiments will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 is an exemplary algorithm for a method of repairing a communication route in a WSN according to an embodiment.

Referring now to the drawings, wherein like reference numerals designate identical or corresponding parts throughout the several views.

DETAILED DESCRIPTION

Figure 1:
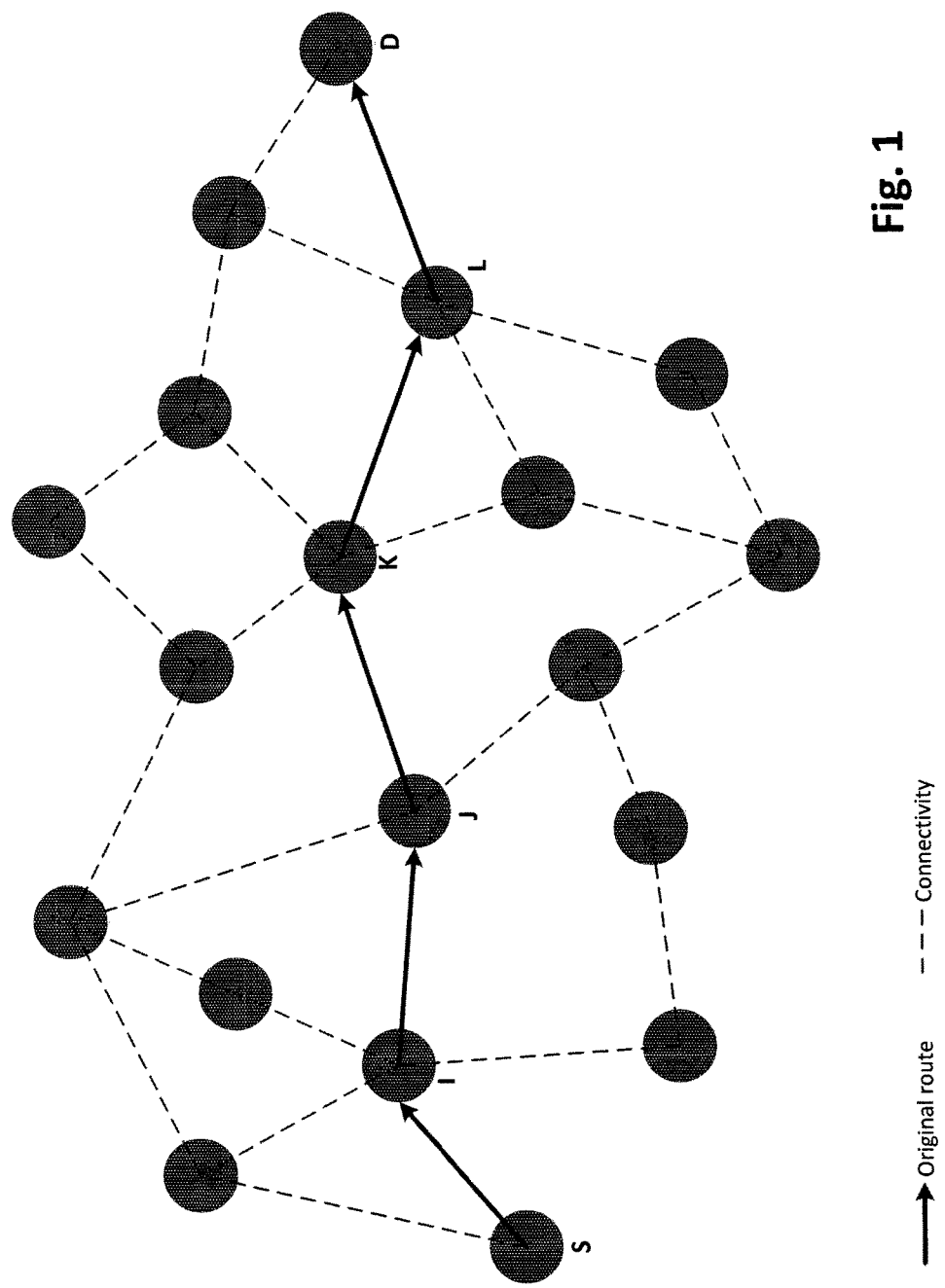
FIG. 1 illustrates an exemplary route bypassing in AODV routing protocol according to an embodiment.

An ad hoc network is formed by a group of mobile devices that communicates without depending on any fixed infrastructure. In such an environment, neighbor nodes communicate directly with each other, while communication between non-neighboring nodes is performed via intermediate nodes, which act as routers. Since node mobility and power limitations exist, the network topology changes frequently. Therefore, efficient routing protocols are necessary to organize and maintain communication between the nodes. Routing protocols for ad hoc networks can be categorized as proactive and reactive routing protocols. In proactive routing protocols, routing information about every possible destination is stored at each node. See Perkins, C. E and Bhagvat, P. 1994. Highly dynamic destination-sequenced distance-vector routing (DSDV) for mobile computers. Conference on Communications architectures, protocols and applications (SIGCOMM '94), 24, 4 (October 1994), 234-244, incorporated herein by reference in its entirety. Any change in network topology triggers propagating updates throughout the network in order to maintain a consistent network view (heavy bandwidth utilization). Reactive routing protocols try to utilize network bandwidth by creating routes only when desired by the source node. See Johnson, D. B., Maltz, D. A., Hu, Y. C. and Jetcheva, J. G. 2002. The dynamic source routing protocol for mobile ad hoc networks (DSR). Draft-ietf-manet-dsr-07.txt.; Perkins, C. E., Royer, E. M. and Das, S. R. 1999. Ad Hoc On-Demand Distance Vector Routing. IETF Internet Draft. http://www.ietf.org/internet-drafts/draft-ietf-manetaodv-03.txt; each incorporated herein by reference in their entirety. Once a route has been established, it is maintained by a route maintenance mechanism as long as it is needed by the source node.

Wireless networks are prone to route breaks resulting from different sources, such as node mobility, signal interference, high error rates, fading environment, and packet collision. Mobility produces an actual route break, while other sources produce a factious route break. MAC protocol, IEEE 802.11, translates unsuccessful packet transmission as link failure. See Fall, K. and Varadham, K. 1997. The ns manual http://www.isi.edu/nsnam/ns/ns-documentation.html/, incorporated herein by reference in its entirety. In current IEEE 802.11 standards, a node will try to send a packet up to seven times for smaller packets and four times for longer packets before deciding the transmission can't be completed. It has no ability to distinguish whether unsuccessful transmission has occurred, due to mobility or something else. Routing protocols have one of the following three choices in which to deal for such a link error:

Do nothing, wherein the source node will timeout waiting for a positive acknowledgment from the destination. After the timeout occurrence, the source node will start a new route discovery cycle.

Report the error to the source node immediately by propagating a RERR message. The source node may choose to re-initiate a route discovery for that destination, if a route is still desired.

Invoke a local recovery process to bypass the link in error. Some processes concentrate on utilizing network resources by reducing the frequency of flooding, such as multi-path routing. See Marina, M K. and Das, S. R. 2001. On-demand multipath distance vector routing in ad hoc networks. In Proceedings of IEEE International Conference on Network Protocols (ICNP), 14-23; Nasipuri, A., Castañeda, R. and Das, S. R. 2001. Performance of multipath routing for on-demand protocols in mobile ad hoc networks. ACM/Baltzer Mobile Networks and Applications (MONET) Journal-6, 4, 339-349; Raju, J. and Garcia-Luna-Aceves, J. J. 1999. A new approach to on demand loop-free multipath routing. In IEEE International Conference on Computer Communications and Networks (ICCCN); Ye, Z., Krishnamurthy, S. V. and Tripathi, S. K. 2003. A framework for reliable routing in mobile ad hoc networks. In Proc. IEEE INFOCOM, each incorporated herein by reference in their entirety. Others concentrate on reducing packet drop, rather than utilizing network resources such as local repair processes. See Cigdem, Sengul and Robin, Kravets. 2006. Bypass routing: An on-demand local recovery protocol for ad hoc networks. Ad Hoc Networks. 4, 3 (January 2006), 380-397; Toh, C. K. 1997. Associativity-based routing for ad hoc mobile networks. *Wireless Personal Communications Journal, Special Issue on Mobile Networking & Computing Systems*, 4, 2 (March 1997), 103-109, each incorporated herein by reference in their entirety.

Bypass-AODV routing protocol uses cross-layer MAC-notification to identify mobility-related packet loss and triggers the routing layer to start local repair. This allows an upstream node of a broken link to do the repair by setting up a bypass between it and the downstream node, via an alternative node. MAC-notification messages are used to distinguish between mobility-related packet loss and other source-related packet loss (signal interference, high error rates, fading environment, and packet collision). A bypassing mechanism works with a specified TTL value to limit the area of route search. Results have shown a TTL value of two is usually enough to bypass a broken link. Therefore, route bypassing can minimize routing overhead.

In contrast to an AODV local repair mechanism, Bypass-AODV is a local recovery protocol that uses cross-layer MAC-notification to identify mobility-related link break and set up a bypass between the broken-link end nodes via an alternative node, while keeping the rest of the route. See A. M. Alshanyour and U. Baroudi, 2008. Bypass AODV: improving performance of ad hoc on-demand distance vector (AODV) routing protocol in wireless ad hoc networks. Proceedings of the 1$^{st}$ *International Conference on Ambient Media and Systems*, p. 17. Bypass-AODV routing protocol has the ability to repair the broken route regardless of the break location and consequently, it will minimize packet losses. Packet losses occur when route bypassing does not work, for example, the distance between upstream and downstream nodes of a broken link is more than two hops or there is power depletion of the downstream node. In such cases, no bypass can be constructed with the downstream node and a RERR message is propagated toward the source node after a timeout value. Route bypassing results in an unnecessary increase in hop-count metric. This increase depends on the frequency of route bypassing. To handle this issue, the bypassed route is a temporary route which lasts for a long enough period to guarantee the packets leaving the source node will reach their final destination.

Route connectivity maintenance systems and methods of Bypass-AODV routing protocol improve the performance of an existing on-demand routing protocol, such as AODV routing protocol. Bypass-AODV routing protocol reduces bandwidth consumption and increases the network throughput by increasing the route reliability for highly-mobile ad hoc wireless networks. The Bypass-AODV routing protocol initially follows the route discovery mechanism of AODV routing protocol. In case of failure in the primary route, Bypass-AODV routing protocol uses cross-layer MAC-notification to identify mobility-related packet loss, and it sets up a bypass between the node at which the route failure occurred and its previous successor, via an alternative node. The rest of the route is maintained. Bypass-AODV routing protocol can significantly reduce the routing overhead and lead to a corresponding increase in throughput by avoiding an unnecessary invocation of an error-recovery mechanism.

Bypass construction is independent of the location of route failure and it increases the route reliability by decreasing the number of packet drops, wherein packets can be salvaged by redirecting them over the bypass. Results show Bypass-AODV routing protocol enables fast recovery of broken routes, reduces the number of unnecessary route discoveries initiated by the source node, and increases the delivery ratio while maintaining acceptable routing overhead.

FIG. 1 illustrates route bypassing in AODV routing protocol. Initially, the flow from source S to destination D goes through I, J, K and L nodes. A link break between K and L will be detected by K. Node K will initiate a limited route discovery cycle to search for a route that links it with node L (node K is a bypass source and node L is a bypass destination). Neighbors of node K will receive a RREQ message and rebroadcast it to their neighbors. If the distance between the bypass source and the bypass destination did not change more than one hop, the bypass destination will receive the RREQ message and start unicasting a route reply (RREP) message towards the bypass source.

Figure 2:
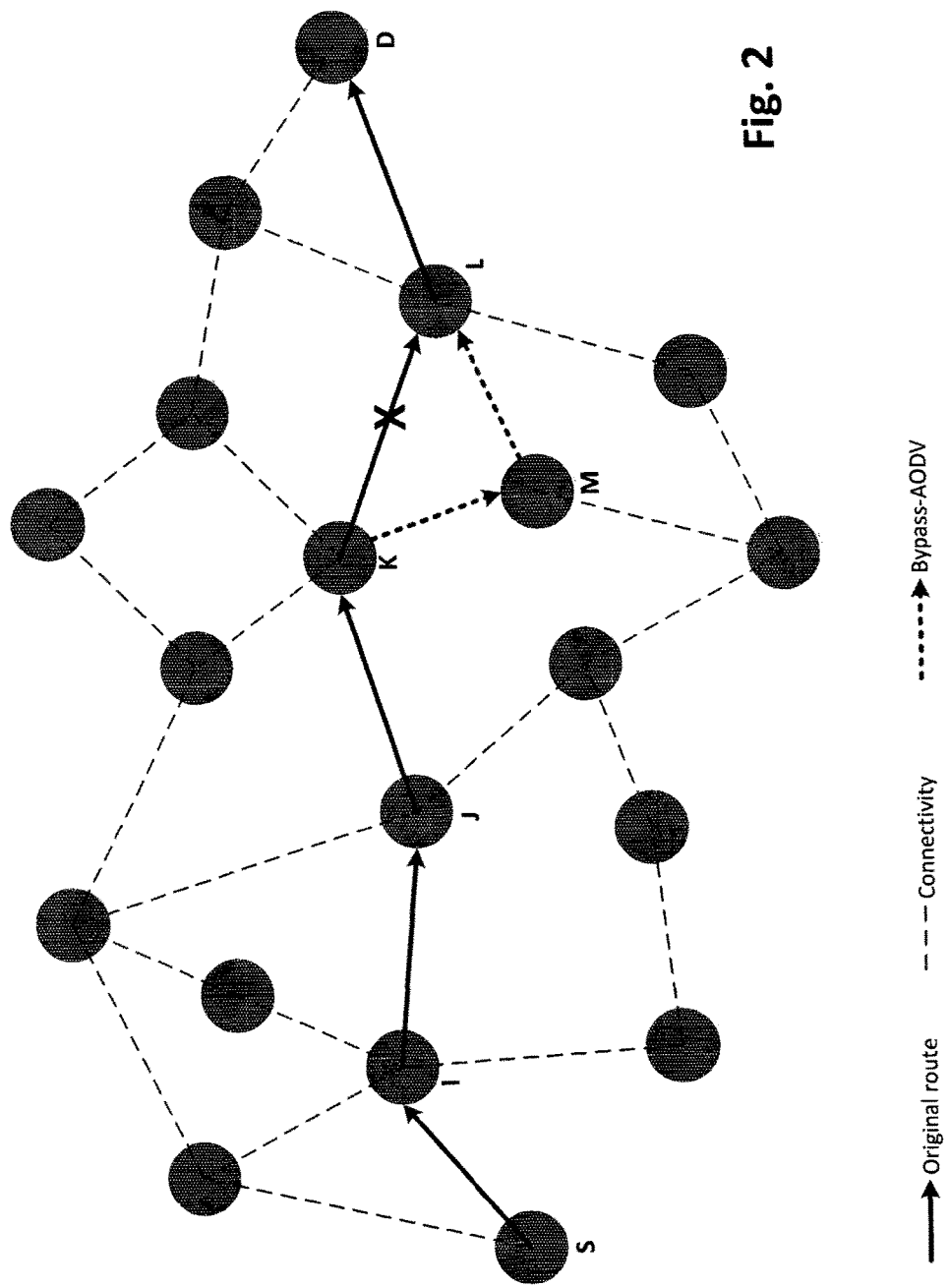
FIG. 2 illustrates a route reply message unicasted to a bypassm source according to an embodiment.

FIG. 2 illustrates a situation in which the RREP message is unicasted to the bypass source via node M. Results have shown that in most cases, the bypass destination receives the RREQ message directly from the bypass source, which means the detected route failure is a factious one. Factious failure results are primarily due to congestion. In such cases, there is no need to bypass the original route.

One of the problems in mobile ad hoc networks involves the ability to distinguish the cause of packet loss at the MAC layer and correspondingly enforce the routing and transport layers to react properly. The MAC protocol translates unsuccessful packet transmission and packet loss as a link failure. It has no ability to distinguish whether packet loss has occurred due to mobility, signal interference, high error rates, fading environment, or a collision. To enhance the response of the MAC layer to packet losses, a prediction mechanism considers any two successive packet losses as a mobility-related failure.

Figure 3:
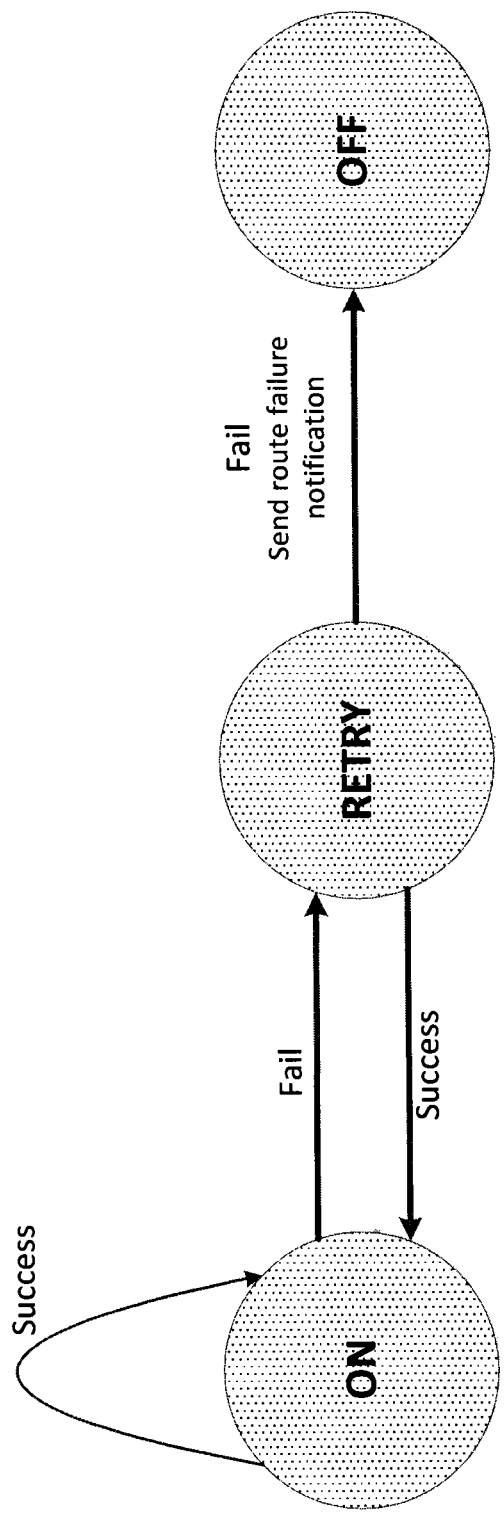
FIG. 3 illustrates a state diagram for enhancing MAC-layer reaction to packet losses according to an embodiment.

A modified-MAC layer protocol defines three different states (ON, RETRY, OFF) for the channel as illustrated in FIG. 3. The channel resides in the ON state if it does not encounter any packet loss. It switches to the RETRY state if it encounters a packet loss, and it switches to the OFF state if it encounters two successive packet losses. The channel returns from the RETRY state back to the ON state if it encounters a successful transmission in the second retry. When the channel enters the OFF state, it generates and sends a route failure notification (RFN) message to the routing layer. FIG. 3 illustrates a state diagram for enhancing MAC layer reaction to packet losses. Packet retransmission results in more delivery delay, but the cost of packet retransmission is negligible compared to the cost of a new route discovery.

For implementation purposes, two types of RREQ and RREP messages can be used. The first type is similar to that used in AODV routing protocol, which is used for a route discovery cycle initiated by the source node. The second type of RREQ and RREP messages are named bypass-RREQ and bypass-RREP messages, which are distinguished by setting one of RREQ/RREP reserved bits. Bypass-RREQ and bypass-RREP messages are used for route bypassing purposes. To keep an AODV routing protocol implementation, each node has a bypass-routing-table in addition to its routing table. A bypass-routing table is used to store routing entries of bypassed routes. When a node receives a RREQ or a RREP message, it directly checks its bypass-routing table to invalidate the corresponding route entries.

Two routing states, UP and DOWN are used in AODV routing protocol. In an UP state, packets are transmitted. In a DOWN state, the received packets are dropped. To implement the local repair mechanism, a REPAIR state is added, which is designated for handling route maintenance. The node that initiates a route maintenance process puts its route in REPAIR state and buffers all incoming packets in addition to the dropped packet.

For Bypass-AODV routing protocol, BYPASS and WAIT states are added. A router uses the BYPASS state to indicate the route is bypassed. A source node uses the WAIT state to stop any further transmission over the bypassed route. A destination node uses the WAIT state to transmit an acknowledgment of the last transmitted packet. To handle the transition between different route states, two control bits can be added to the data packet's IP header for Transmission Control Protocol (TCP) applications. A control message with at least two control bits may also be used for User Datagram Protocol (UDP) applications, due to the absence of Acknowledgement (ACK) data packets. The two control bits are set to 00, 01, 10, or 11. Bypass-AODV routing protocol for TCP applications is described herein.

In an UP state, the control bits of all transmitted packets are set to 00. In a DOWN state, the route is inactive. Upon receiving a new packet, the source node will initiate a route discovery process.

Figure 4A:
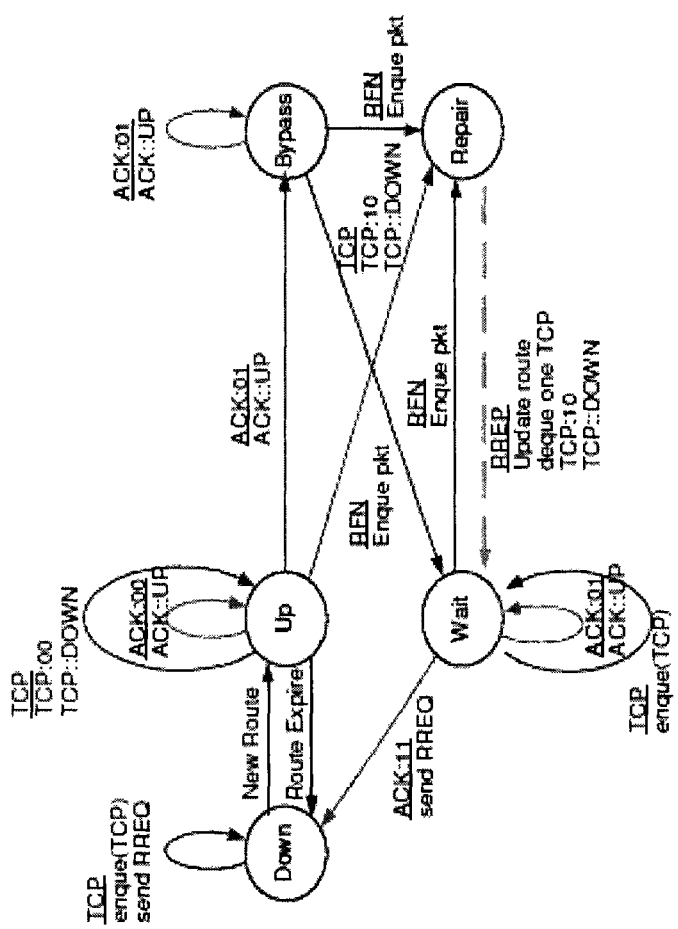
FIG. 4A illustrates a route transition from the REPAIR state to another state for a source node according to an embodiment.
Figure 4B:
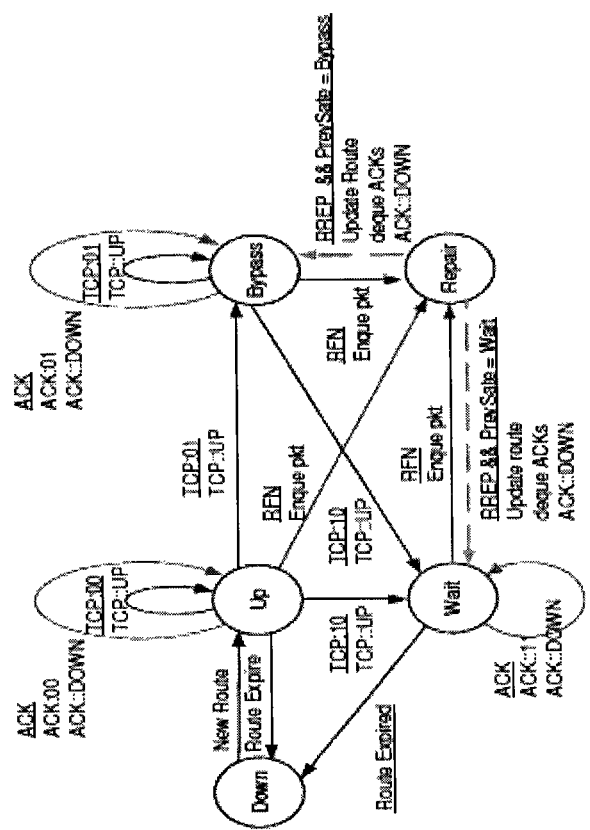
FIG. 4B illustrates a route transition from the REPAIR state to another state for a destination node according to an embodiment.
Figure 4C:
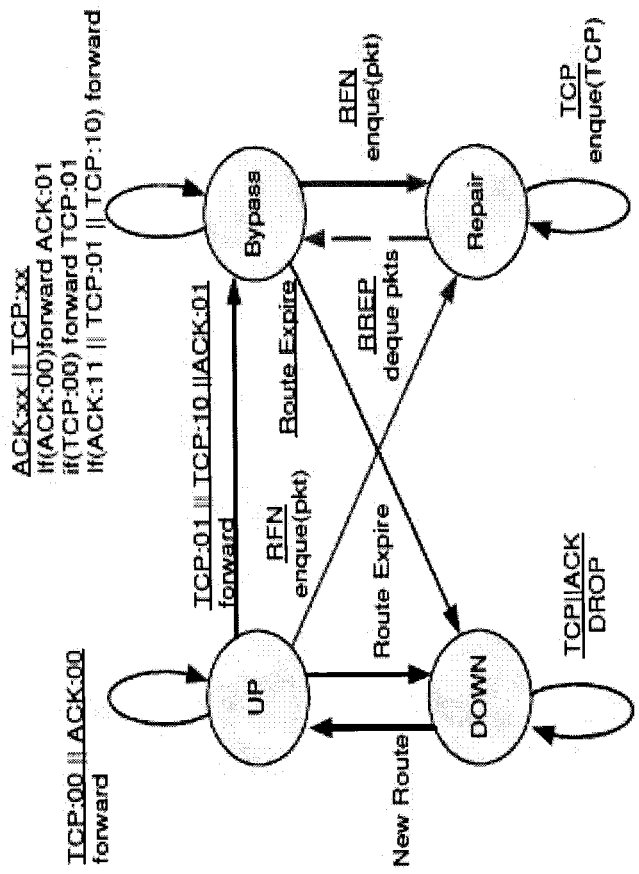
FIG. 4C illustrates a route transition from the REPAIR state to another state for an intermediate node according to an embodiment.

The router switches the route to a REPAIR state as it receives the RFN message. In this state, the router starts a bypassing mechanism by broadcasting a bypass-RREQ message with a limited TTL value to discover a bypass to a broken downstream link. The bypass-RREQ message defines a bypass source and a bypass destination. Data packets received during this state are buffered in the router's buffers to subsequently transmit them over the constructed bypass. FIG. 4A illustrates a route transition from the REPAIR state to another state for a source node. FIG. 4B illustrates a route transition from the REPAIR state to another state for a destination node. FIG. 4C illustrates a route transition from the REPAIR state to another state for an intermediate node.

Embodiments described herein give the router the ability to distinguish between false route failures and true ones. A false route failure is detected by receiving a data packet or an RREP message directly from the bypass destination. In such a situation, the route is switched to the previous state and the RREP message is discarded.

There can be two cases for switching the route to a BYPASS state. For the first case, the router receives a bypass-RREP message that has a number of hops equal to two or a packet whose control bits are 01 or 10. For the second case in a BYPASS state, the router uses the bypass-route-table to forward the received data packets. Control bits of the forwarded packets are set as shown in the corresponding state diagrams of FIGS. 4A, 4B, and 4C.

A WAIT state is used by the source and destination nodes. On the source node side, a WAIT state is used to prepare the source node for transmitting the last data packet over the bypassed route and buffer any subsequent packets received from the above layer. On the destination node side, a WAIT state is used to indicate the reception of the last transmitted data packet.

As the bypass source receives an RFN message, it attempts to repair the broken link by broadcasting a bypass-RREQ message with a TTL value of two to the downstream node (bypass destination) and switches the broken route to a REPAIR state. The bypass-RREQ message contains the IP addresses of the bypass source and the bypass destination and the current bypass-source's sequence number and broadcast ID. In addition, the bypass-RREQ message contains the IP addresses of the end nodes of the primary route. The intermediate nodes rebroadcast the bypass-RREQ message and keep track of the received bypass-RREQ messages by caching their source IP addresses and broadcast IDs. Multiple bypass-RREQ messages with the same source address and broadcast ID are discarded.

The bypass-RREP message is sent by the bypass destination. As soon as the bypass destination receives the bypass-RREQ message, it adds a new routing entry to its bypass-routing table, sets the corresponding route state to BYPASS, invalidates the same route entry in the original route table, and unicasts a bypass-RREP message to the bypass source. Intermediate nodes add to their bypass-routing-tables any new route entries for the broken route's source and destination nodes upon receiving a bypass-RREP, rather than having the bypass source and bypass destination nodes add to their bypass-routing tables. A bypass-RREP message is forwarded by the intermediate nodes to the bypass source using routing entries available in the original routing tables. As a bypass-RREP message is received by the bypass source, it adds a new routing entry to its bypass-routing table, sets its route state to BYPASS, and starts transmitting buffered packets over the constructed bypass.

It is beneficial to maintain the routes discovered between a pair of nodes. The route can be affected with changes which occur for nodes on an active path. If the source node is no longer active during an active session, a route discovery process can be reinitiated to establish a new route to the destination. If the destination or an intermediate node moves in AODV routing protocol, a RERR message is sent to the source node. The node upstream which is closer to the source node lists all of the destinations that are not reachable due to a loss of a link reported in the RERR message. The neighboring nodes which receive the RERR message mark the route to the destination as invalid and propagate the RERR message until it reaches the source node. The source node can reinitiate a route discovery if the route is still needed.

The local connectivity in AODV routing protocol is managed by broadcasting messages sent by neighboring nodes. When a broadcast message is received from a specific neighbor, the lifetime field associated with that neighbor in the routing table is updated. Each node is required to send a Hello packet every Hello_Interval to inform its neighbors that it is still in the vicinity. The Hello message contains the node's IP and the current sequence number.

A local recovery protocol can be used to enhance the performance of AODV routing protocol. Instead of reconstructing a full route for the occurrence of route errors, Bypass-AODV routing protocol uses cross-layer MAC-notification to identify mobility-related link breaks and set up a bypass between the broken-link end nodes, via an alternative node while it stays on the rest of the route. Simulation results have shown Bypass-AODV routing protocol outperformed AODV routing protocol in terms of throughput and packet drop ratio.

In AODV routing protocol, the occurrence of a link break during an active communication session can cause the source node to create a new route and send the data again. Embodiments described herein modify AODV routing protocol by taking advantage of packets already sent in a data session.

Figure 5:
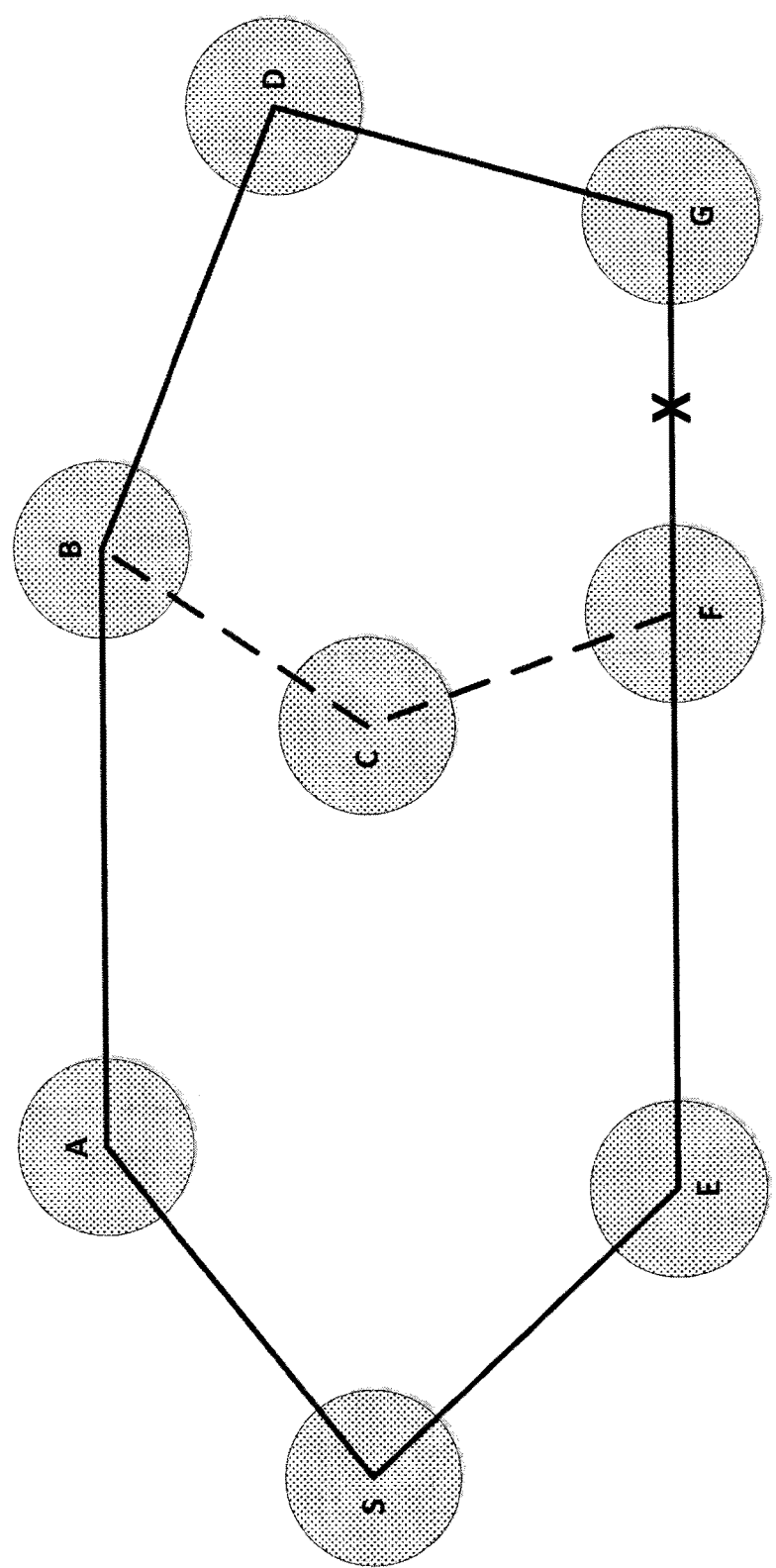
FIG. 5 illustrates a created route through multiple nodes during an active data session according to an embodiment.

FIG. 5 illustrates a created route through nodes S-E-F-G-D during an active data session. Before the data session is finished, the energy of node G has become drained and therefore, the link between nodes F and G has been broken. Node F realizes a link break is present in the route during the active session and buffers the incoming packets from Node S. Node F sends a RERR message to Node S asking it to extend the route lifetime. Node F initiates a local route repair through its neighboring nodes. For example, the bypass route F-C-B-D is built and is used to resume the data session between Nodes S and D. Node F sends the buffered packets to Node D through the newly discovered route. The broken link may not be repaired during the route active timeout interval. The source node can reinitiate a route discovery to send the data again.

The energy level and energy harvesting rate of a node play a major role in Energy Harvesting AODV (EHAODV) routing protocol. The node has a battery in which it saves its energy. A zero battery level indicates the node energy is fully discharged. The battery capacity is assumed to be high enough so the node can save all of its harvested energy.

The node battery level varies continuously based on the node activity. Each time the node receives or sends a packet, it loses some energy. Depending on the ambient energy availability, the node charges its battery. It is important to optimize the routing, such that the harvested energy doesn't get wasted.

The format of a RERR message can be similar to or the same as that used for AODV routing protocol. A No_delete_flag (N) can be used to implement a route repair mechanism. In EHAODV routing protocol, an intermediate node can set the flag to true so that upstream nodes don't invalidate the unreachable routes in the RERR message. When a node receives a RERR message with flag N set to true, it will reset the route active timeout to its initial value.

Figure 6:
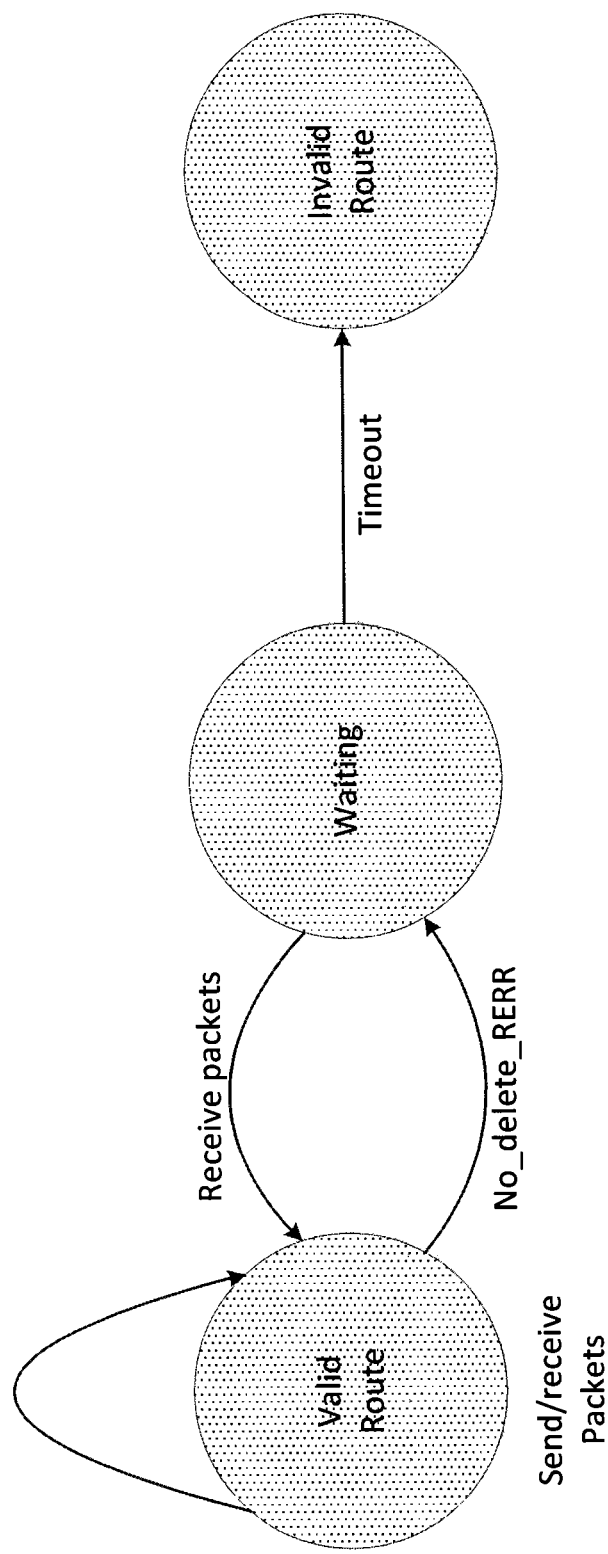
FIG. 6 illustrates a state of the route for a source node during a route repair process according to an embodiment.
Figure 7:
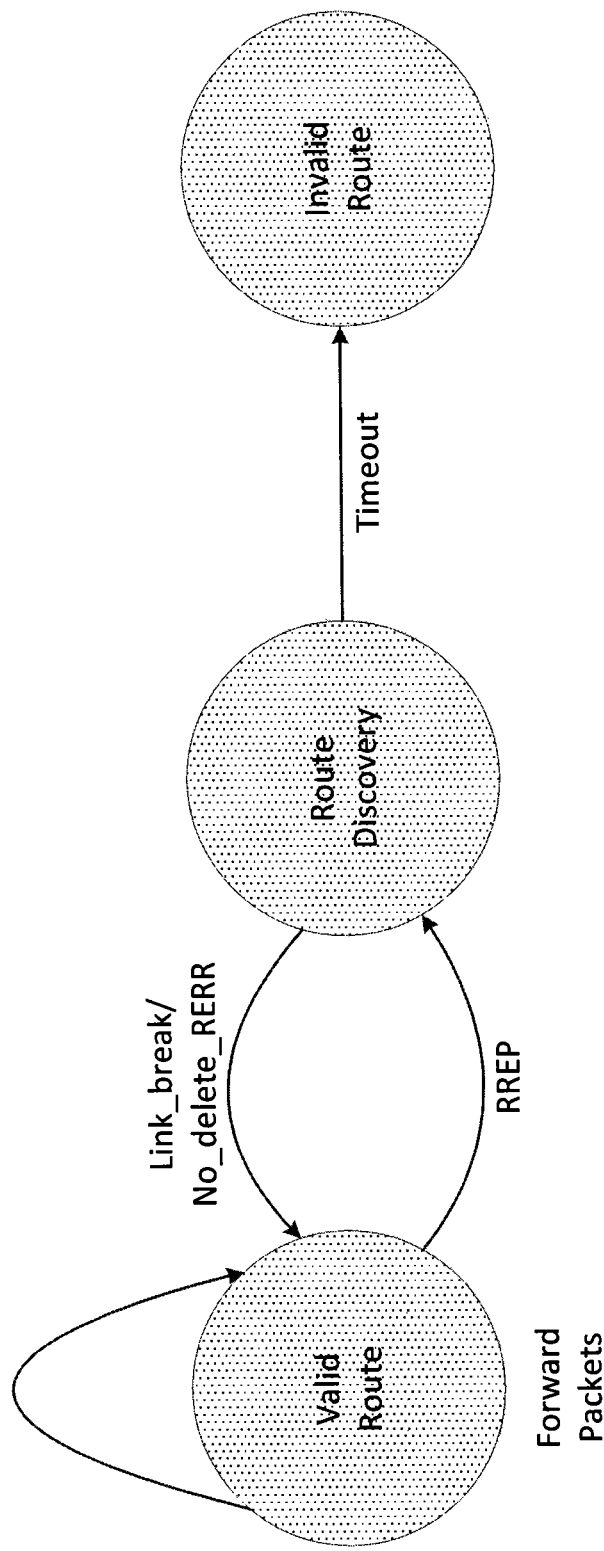
FIG. 7 illustrates a state of the route for an upstream node during a route repair process according to an embodiment.

FIG. 6 illustrates a state of the route for a source node during a route repair process. FIG. 7 illustrates a state of the route for an upstream node during a route repair process. Initially, a route discovery process is implemented by the source node to create an active route in the source node and the intermediate node(s). The route has a timeout interval in which the route is deleted if it is not used. Whenever a packet is sent through the route, the timeout interval is set to its initial value.

When a link break occurs, the upstream node sends a RERR message to the source node with a No_delete_flag set to true and starts a route discovery process to the destination node. When the source node receives the RERR message, the route timeout value is set to the initial value and the node enters a waiting state. If the route discovery at the upstream node succeeds, the node resumes sending the queued packets to the destination node. Otherwise, the route is marked as invalid. When the source node receives a ACK packet from the destination node, the source node resumes sending packets to the destination node. Otherwise, if the timeout is triggered, the source node invalidates the route. The timeout value can be the same active_route_timeout used in EHA-ODV routing protocol.

Figure 8:
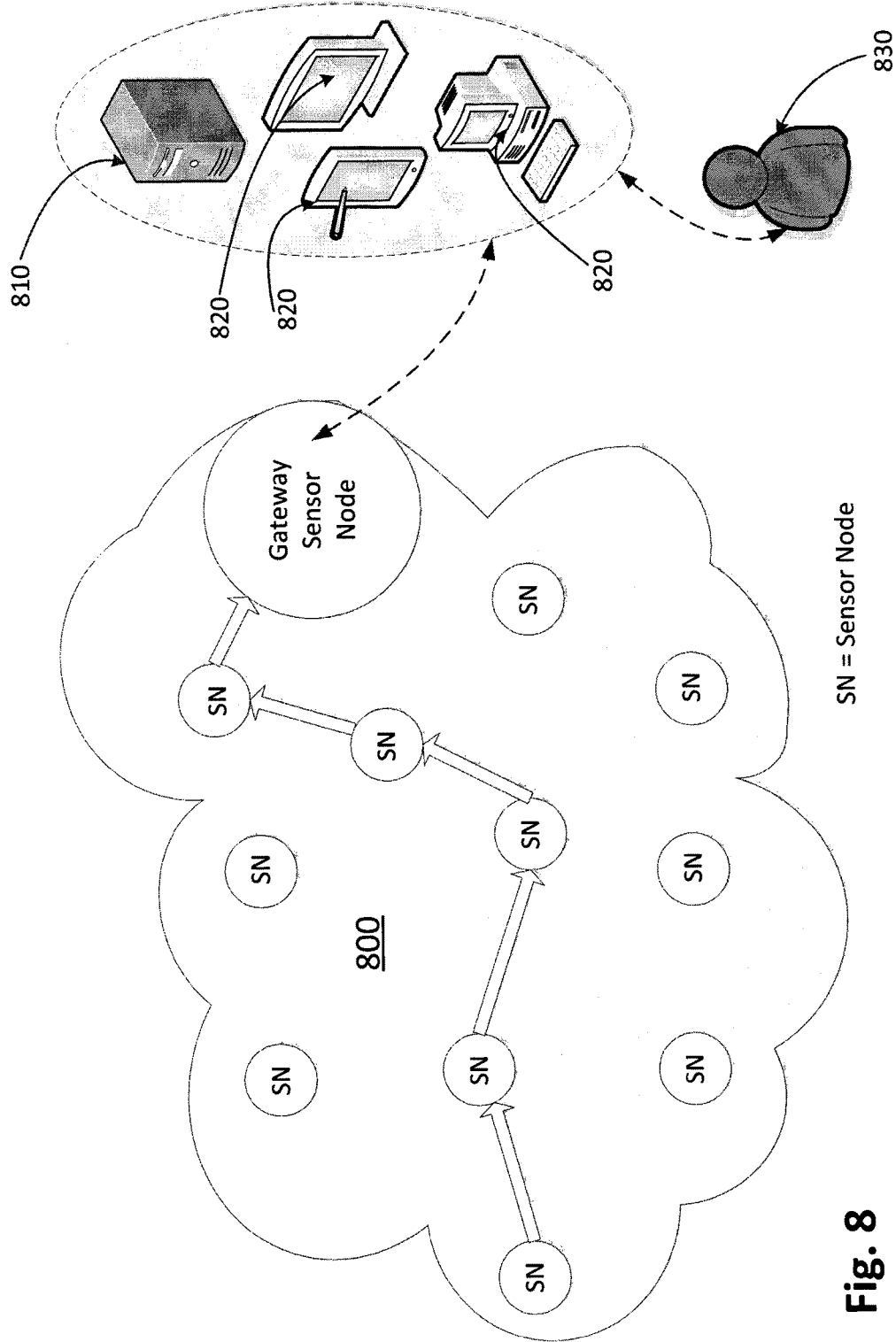
FIG. 8 illustrates an exemplary WSN architecture according to an embodiment.

FIG. 8 illustrates an exemplary WSN architecture 800 as used with embodiments described herein. A WSN includes a plurality of spatially distributed autonomous sensors, each configured to monitor physical and/or environmental conditions, such as temperature, sound, and pressure and to cooperatively pass their data to an associated sensor node and subsequently through the WSN to a main location, such as a gateway sensor node. A WSN can be bi-directional, which enables it to control sensor activity, as well as receive data from the sensors.

Each sensor node includes structural features for retrieving sensor data and passing the data to an adjacent sensor node, and eventually to the gateway sensor node. Structural node features include a radio transceiver with an internal antenna or connection to an external antenna, a microcontroller, and an electronic circuit for interfacing with other sensor nodes and to an energy source. The energy source can be a battery and/or an embedded form of energy harvesting. A sensor node can vary in size depending upon purpose, cost, and energy requirements.

FIG. 8 also illustrates one or more servers 810 in which the WSN is controlled, and various client devices 820 in which a user 830 has access to the WSN. Connections between the user 830 and the client devices 820 and/or the server 810 can be wired connections and/or wireless connections. Likewise, the connection between the gateway sensor node and the client devices 820 and/or the server 810 can be wired connections and/or wireless connections.

The topology of a WSN can vary from a simple star network to an advanced multi-hop wireless mesh network. FIG. 8 illustrates just a few sensor nodes for simplicity. However, embodiments described herein are not limited to a particular size, topology, or function of the WSN.

Figure 9:
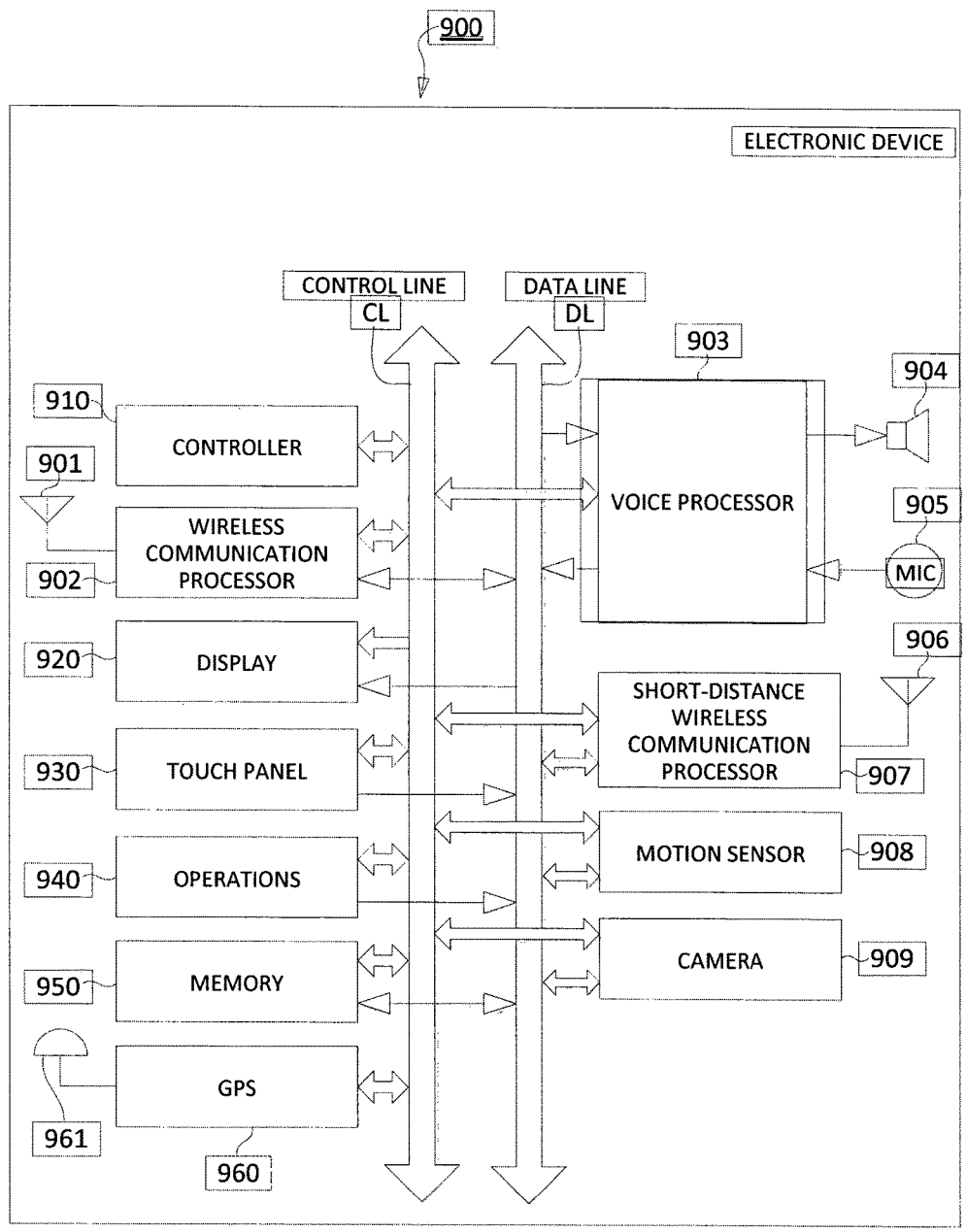
FIG. 9 is a block diagram illustrating an exemplary electronic device according to an embodiment.

FIG. 9 is a block diagram illustrating an exemplary electronic device used in accordance with embodiments of the present disclosure. In the embodiments, electronic device 900 can be a smartphone, a laptop, a tablet, a server, an e-reader, a camera, a navigation device, etc. Electronic device 900 could be used as one or more of the client devices 820 illustrated in FIG. 8.

The exemplary electronic device 900 of FIG. 9 includes a controller 910 and a wireless communication processor 902 connected to an antenna 901. A speaker 904 and a microphone 905 are connected to a voice processor 903. The controller 910 can include one or more Central Processing Units (CPUs), and can control each element in the electronic device 900 to perform functions related to communication control, audio signal processing, control for the audio signal processing, still and moving image processing and control, and other kinds of signal processing. The controller 910 can perform these functions by executing instructions stored in a memory 950. Alternatively or in addition to the local storage of the memory 950, the functions can be executed using instructions stored on an external device accessed on a network or on a non-transitory computer readable medium.

The memory 950 includes but is not limited to Read Only Memory (ROM), Random Access Memory (RAM), or a memory array including a combination of volatile and non-volatile memory units. The memory 950 can be utilized as working memory by the controller 910 while executing the processes and algorithms of the present disclosure. Additionally, the memory 950 can be used for long-term storage, e.g., of image data and information related thereto.

The electronic device 900 includes a control line CL and data line DL as internal communication bus lines. Control data to/from the controller 910 can be transmitted through the control line CL. The data line DL can be used for transmission of voice data, display data, etc.

The antenna 901 transmits/receives electromagnetic wave signals between base stations for performing radio-based communication, such as the various forms of cellular telephone communication. The wireless communication processor 902 controls the communication performed between the electronic device 900 and other external devices via the antenna 901. For example, the wireless communication processor 902 can control communication between base stations for cellular phone communication.

The speaker 904 emits an audio signal corresponding to audio data supplied from the voice processor 903. The microphone 905 detects surrounding audio and converts the detected audio into an audio signal. The audio signal can then be output to the voice processor 903 for further processing. The voice processor 903 demodulates and/or decodes the audio data read from the memory 950 or audio data received by the wireless communication processor 902 and/or a short-distance wireless communication processor 907. Additionally, the voice processor 903 can decode audio signals obtained by the microphone 905.

The exemplary electronic device 900 can also include a display 920, a touch panel 930, an operations key 940, and a short-distance communication processor 907 connected to an antenna 906. The display 920 can be a Liquid Crystal Display (LCD), an organic electroluminescence display panel, or another display screen technology. In addition to displaying still and moving image data, the display 920 can display operational inputs, such as numbers or icons which can be used for control of the electronic device 900. The display 920 can additionally display a GUI for a user to control aspects of the electronic device 900 and/or other devices. Further, the display 920 can display characters and images received by the electronic device 900 and/or stored in the memory 950 or accessed from an external device on a network. For example, the electronic device 900 can access a network such as the Internet and display text and/or images transmitted from a Web server.

The touch panel 930 can include a physical touch panel display screen and a touch panel driver. The touch panel 930 can include one or more touch sensors for detecting an input operation on an operation surface of the touch panel display screen. The touch panel 930 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 930 can detect when the stylus approaches/contacts the operation surface of the touch panel display (similar to the case in which a finger is used for the touch operation).

According to aspects of the present disclosure, the touch panel 930 can be disposed adjacent to the display 920 (e.g., laminated) or can be formed integrally with the display 920. For simplicity, the present disclosure assumes the touch panel 930 is formed integrally with the display 920 and therefore, examples discussed herein can describe touch operations being performed on the surface of the display 920 rather than the touch panel 930. However, the skilled artisan will appreciate that this is not limiting.

For simplicity, the present disclosure assumes the touch panel 930 is a capacitance-type touch panel technology. However, it should be appreciated that aspects of the present disclosure can easily be applied to other touch panel types (e.g., resistance-type touch panels) with alternate structures. According to aspects of the present disclosure, the touch panel 930 can include transparent electrode touch sensors arranged in the X-Y direction on the surface of transparent sensor glass.

The touch panel driver can be included in the touch panel 930 for control processing related to the touch panel 930, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. Signals can be transmitted by the touch panel driver, e.g. in response to a detection of a touch operation, in response to a query from another element based on timed data exchange, etc.

The touch panel 930 and the display 920 can be surrounded by a protective casing, which can also enclose the other elements included in the electronic device 900. According to aspects of the disclosure, a position of the user's fingers on the protective casing (but not directly on the surface of the display 920) can be detected by the touch panel 930 sensors. Accordingly, the controller 910 can perform display control processing described herein based on the detected position of the user's fingers gripping the casing. For example, an element in an interface can be moved to a new location within the interface (e.g., closer to one or more of the fingers) based on the detected finger position.

Further, according to aspects of the disclosure, the controller 910 can be configured to detect which hand is holding the electronic device 900, based on the detected finger position. For example, the touch panel 930 sensors can detect a plurality of fingers on the left side of the electronic device 900 (e.g., on an edge of the display 920 or on the protective casing), and detect a single finger on the right side of the electronic device 900. In this exemplary scenario, the controller 910 can determine that the user is holding the electronic device 900 with his/her right hand because the detected grip pattern corresponds to an expected pattern when the electronic device 900 is held only with the right hand.

The operation key 940 can include one or more buttons or similar external control elements, which can generate an operation signal based on a detected input by the user. In addition to outputs from the touch panel 930, these operation signals can be supplied to the controller 910 for performing related processing and control. According to aspects of the disclosure, the processing and/or functions associated with external buttons and the like can be performed by the controller 910 in response to an input operation on the touch panel 930 display screen rather than the external button, key, etc. In this way, external buttons on the electronic device 900 can be eliminated in lieu of performing inputs via touch operations, thereby improving water-tightness.

The antenna 906 can transmit/receive electromagnetic wave signals to/from other external apparatuses, and the short-distance wireless communication processor 907 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 907.

The electronic device 900 can include a motion sensor 908. The motion sensor 908 can detect features of motion (i.e., one or more movements) of the electronic device 900. For example, the motion sensor 908 can include an accelerometer to detect acceleration, a gyroscope to detect angular velocity, a geomagnetic sensor to detect direction, a geo-location sensor to detect location, etc., or a combination thereof to detect motion of the electronic device 900. According to aspects of the disclosure, the motion sensor 908 can generate a detection signal that includes data representing the detected motion. For example, the motion sensor 908 can determine a number of distinct movements in a motion (e.g., from start of the series of movements to the stop, within a predetermined time interval, etc.), a number of physical shocks on the electronic device 900 (e.g., a jarring, hitting, etc., of the electronic device 900), a speed and/or acceleration of the motion (instantaneous and/or temporal), or other motion features. The detected motion features can be included in the generated detection signal. The detection signal can be transmitted, e.g., to the controller 910, whereby further processing can be performed based on data included in the detection signal. The motion sensor 908 can work in conjunction with a Global Positioning System (GPS) 960. The GPS 960 detects the present position of the electronic device 900. The information of the present position detected by the GPS 960 is transmitted to the controller 910. An antenna 961 is connected to the GPS 960 for receiving and transmitting signals to and from a GPS satellite.

Electronic device 900 can include a camera 909, which includes a lens and shutter for capturing photographs of the surroundings around the electronic device 900. In an embodiment, the camera 909 captures surroundings of an opposite side of the electronic device 900 from the user. The images of the captured photographs can be displayed on the display panel 920. A memory saves the captured photographs. The memory can reside within the camera 909 or it can be part of the memory 950. The camera 909 can be a separate feature attached to the electronic device 900 or it can be a built-in camera feature.

Figure 10:
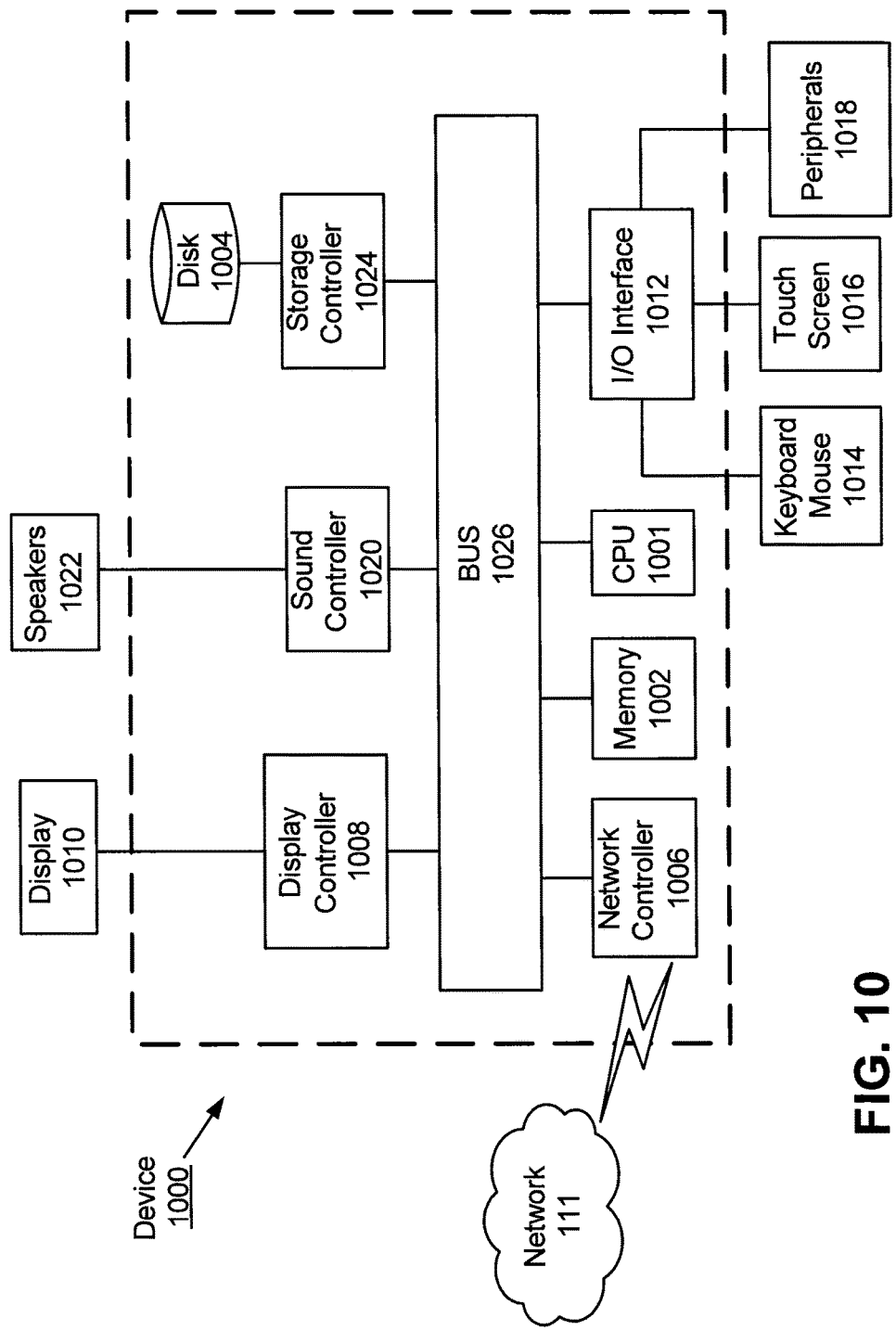
FIG. 10 is a block diagram illustrating an exemplary computing device according to an embodiment.

Next, a hardware description of an exemplary computing device 1000 used in accordance with some embodiments described herein is given with reference to FIG. 10. Features described above with reference to electronic device 900 of FIG. 9 can be included in the computing device 1000 described below. Computing device 1000 could be used as one or more of the client devices 820 or the server(s) 810 illustrated in FIG. 8. Computing device 1000 could also be used as one or more of the sensor nodes or the gateway sensor node illustrated in FIG. 8.

In FIG. 10, the computing device 1000 includes a CPU 1001 which performs the processes described above and herein after. The process data and instructions can be stored in memory 1002. These processes and instructions can also be stored on a storage medium disk 1004 such as a hard drive (HDD) or portable storage medium or can be stored remotely. Further, the claimed features are not limited by the form of the computer-readable media on which the instructions of the process are stored. For example, the instructions can be stored on CDs, DVDs, in FLASH memory, RAM, ROM, PROM, EPROM, EEPROM, hard disk or any other information processing device with which the computing device 1000 communicates, such as a server or computer.

Further, the claimed features can be provided as a utility application, background daemon, or component of an operating system, or combination thereof, executing in conjunction with CPU 1001 and an operating system such as Microsoft Windows 7, UNIX, Solaris, LINUX, Apple MAC-OS and other systems known to those skilled in the art.

The hardware elements in order to achieve the computing device 1000 can be realized by various circuitry elements, known to those skilled in the art. For example, CPU 1001 can be a Xenon or Core processor from Intel of America or an Opteron processor from AMD of America, or can be other processor types that would be recognized by one of ordinary skill in the art. Alternatively, the CPU 1001 can be implemented on an FPGA, ASIC, PLD or using discrete logic circuits, as one of ordinary skill in the art would recognize. Further, CPU 1001 can be implemented as multiple processors cooperatively working in parallel to perform the instructions of the inventive processes described above and below.

The computing device 1000 in FIG. 10 also includes a network controller 1006, such as an Intel Ethernet PRO network interface card from Intel Corporation of America, for interfacing with network 111. As can be appreciated, the network 111 can be a public network, such as the Internet, or a private network such as an LAN or WAN network, or any combination thereof and can also include PSTN or ISDN sub-networks. The network 111 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device 1000 further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. Touch screen panel 1016 includes features described above with reference to touch panel 930 of FIG. 9. General purpose I/O interface 1012 also connects to a variety of peripherals 1018 including printers and scanners, such as an OfficeJet or DeskJet from Hewlett Packard.

A sound controller 1020 is also provided in the computing device 1000, such as Sound Blaster X-Fi Titanium from Creative, to interface with speakers/microphone 1022 thereby providing sounds and/or music.

The general purpose storage controller 1024 connects the storage medium disk 1004 with communication bus 1026, which can be an ISA, EISA, VESA, PCI, or similar, for interconnecting all of the components of the computing device 1000. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure can be replaced with other elements and structured differently than the examples provided herein. Moreover, circuitry configured to perform features described herein can be implemented in multiple circuit units (e.g., chips), or the features can be combined in circuitry on a single chipset, as shown on FIG. 11. The chipset of FIG. 11 can be implemented in conjunction with either electronic device 900 or computing device 1000 described above with reference to FIGS. 9 and 10, respectively.

Figure 11:
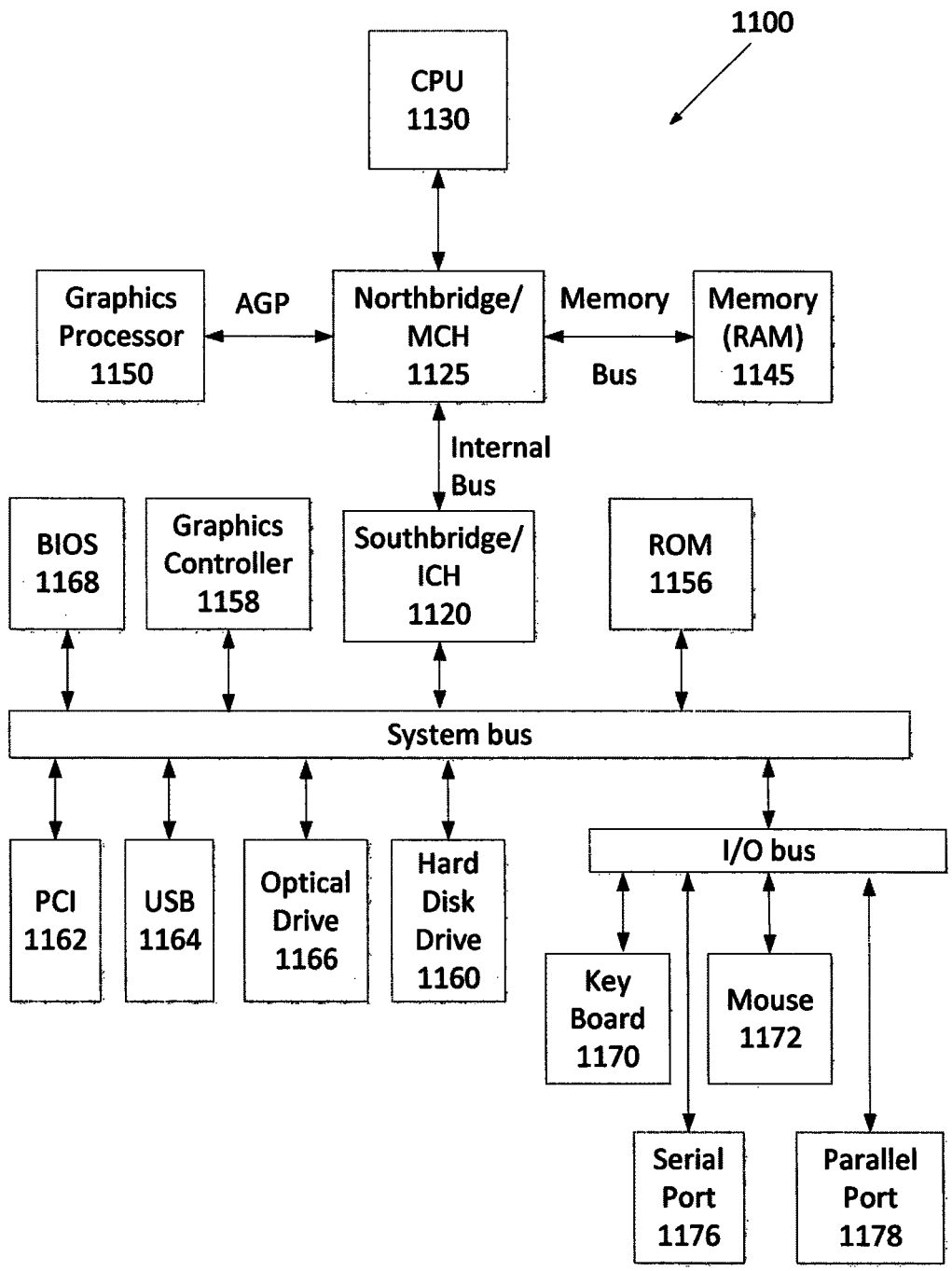
FIG. 11 is a block diagram illustrating an exemplary chipset according to an embodiment.

FIG. 11 shows a schematic diagram of a data processing system, according to aspects of the disclosure described herein for performing menu navigation, as described above. The data processing system is an example of a computer in which code or instructions implementing the processes of the illustrative embodiments can be located.

In FIG. 11, data processing system 1100 employs an application architecture including a north bridge and memory controller application (NB/MCH) 1125 and a south bridge and input/output (I/O) controller application (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU 1130 can contain one or more processors and even can be implemented using one or more heterogeneous processor systems.

Figure 12:
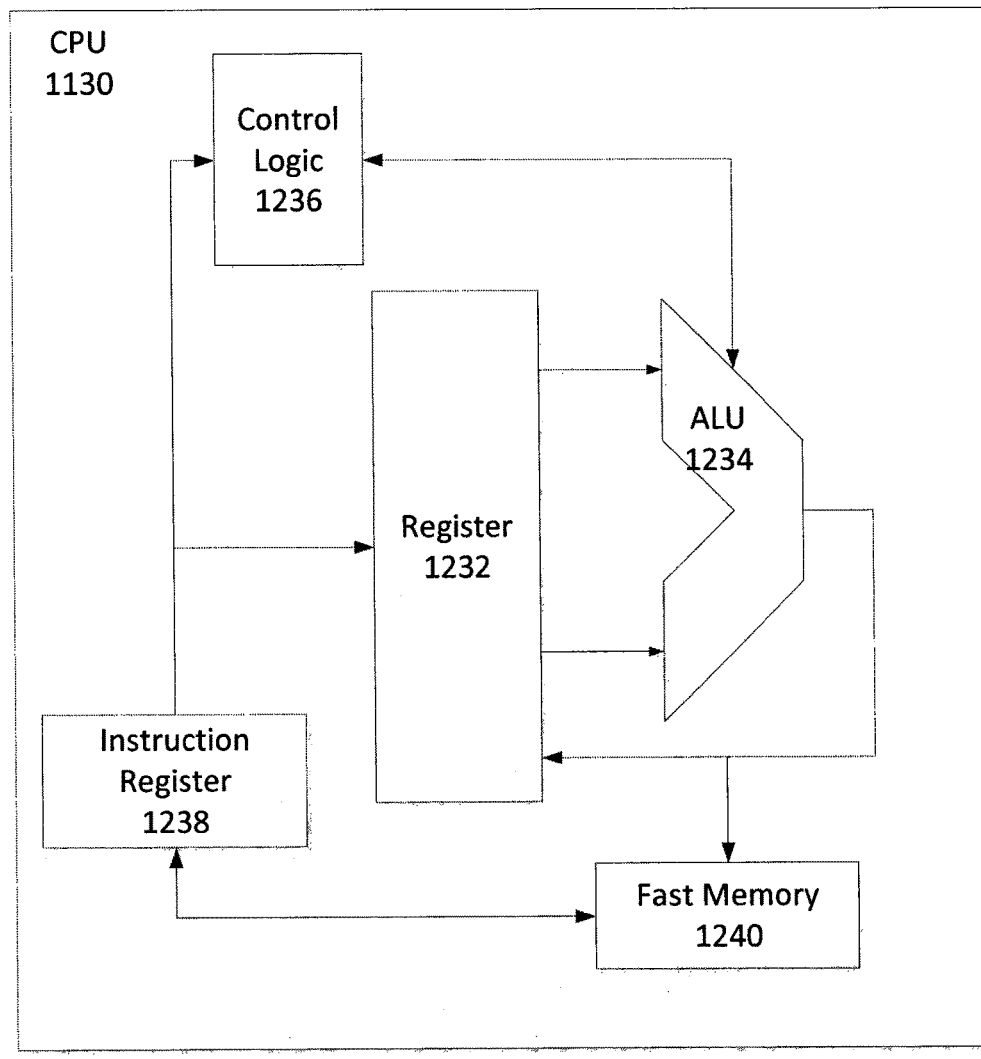
FIG. 12 is a block diagram illustrating an exemplary CPU of a chipset according to an embodiment.

For example, FIG. 12 shows one implementation of CPU 1130. In one implementation, an instruction register 1238 retrieves instructions from a fast memory 1240. At least part of these instructions are fetched from an instruction register 1238 by a control logic 1236 and interpreted according to the instruction set architecture of the CPU 1130. Part of the instructions can also be directed to a register 1232. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 1234 that loads values from the register 1232 and performs logical and mathematical operations on the loaded values according to the instructions. The results from these operations can be fed back into the register 1232 and/or stored in a fast memory 1240. According to aspects of the disclosure, the instruction set architecture of the CPU 1130 can use a reduced instruction set computer (RISC), a complex instruction set computer (CISC), a vector processor architecture, or a very long instruction word (VLIW) architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 11, the data processing system 1100 can include the SB/ICH 1120 being coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices can include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein can also be executed by various distributed components of a system. For example, one or more processors can execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet. Input to the system can be received via direct user input and received remotely either in real-time or as a batch process. Additionally, some implementations can be performed on modules or hardware not identical to those described. Accordingly, other implementations are within the scope that can be claimed.

The functions and features described herein may also be executed by various distributed components of a system. For example, one or more processors may execute these system functions, wherein the processors are distributed across multiple components communicating in a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Figure 13:
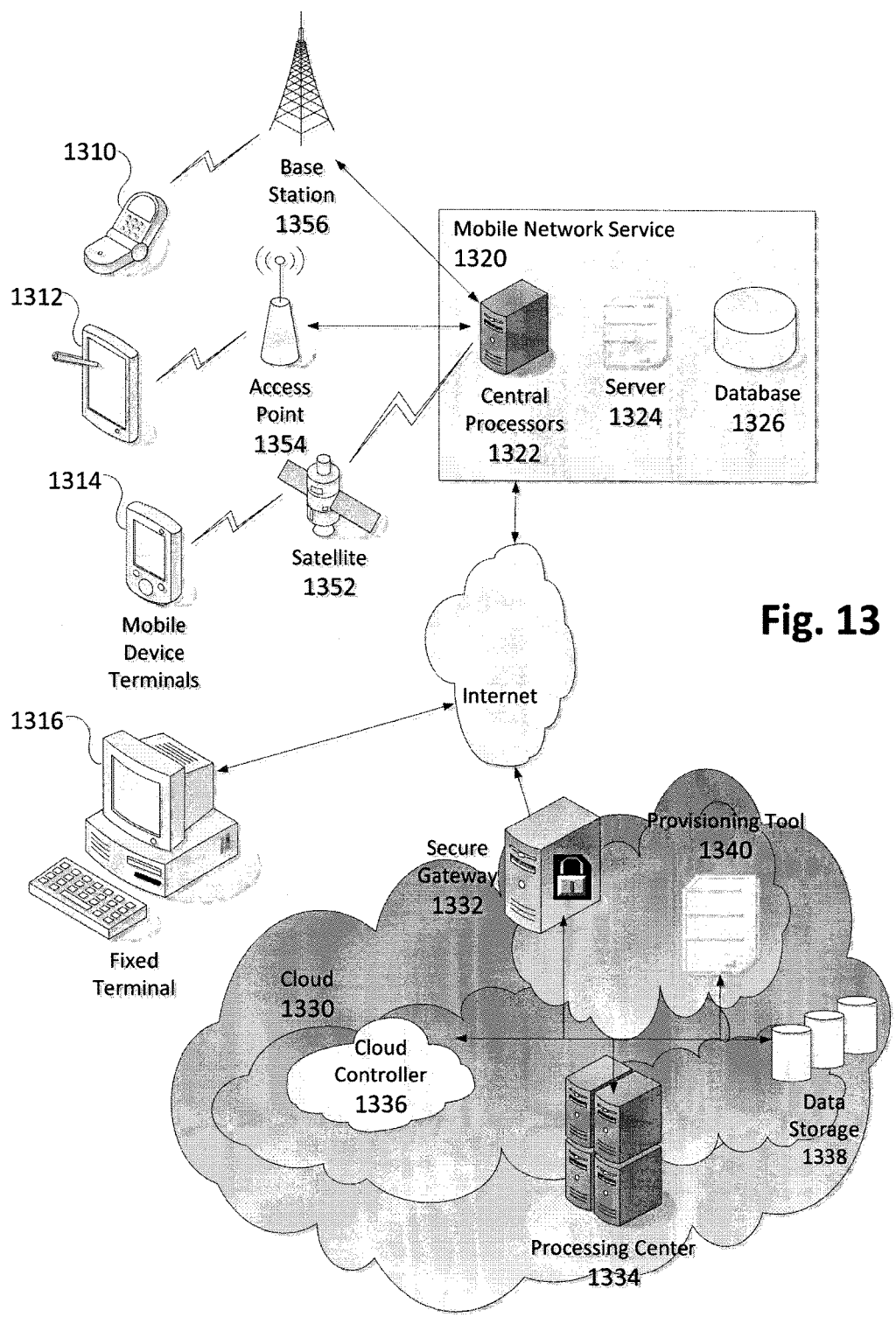
FIG. 13 illustrates an exemplary cloud computing system according to an embodiment.

FIG. 13 illustrates an example of a cloud computing system, wherein users access the cloud through mobile device terminals or fixed terminals that are connected to the Internet. One or more of the devices illustrated in the WSN architecture 800 of FIG. 8 could be used in the cloud computing system illustrated in FIG. 13.

The mobile device terminals can include a cell phone 1310, a tablet computer 1312, and a smartphone 1314, for example. The mobile device terminals can connect to a mobile network service 1320 through a wireless channel such as a base station 1356 (e.g., an Edge, 3G, 4G, or LTE Network), an access point 1354 (e.g., a femto cell or WiFi network), or a satellite connection 1352. In one implementation, signals from the wireless interface to the mobile device terminals (e.g., the base station 1356, the access point 1354, and the satellite connection 1352) are transmitted to a mobile network service 1320, such as an EnodeB and radio network controller, UMTS, or HSDPA/HSUPA. Mobile users' requests and information are transmitted to central processors 1322 that are connected to servers 1324 to provide mobile network services, for example. Further, mobile network operators can provide service to mobile users for authentication, authorization, and accounting based on home agent and subscribers' data stored in databases 1326, for example. The subscribers' requests are subsequently delivered to a cloud 1330 through the Internet.

A user can also access the cloud through a fixed terminal 1316, such as a desktop or laptop computer or workstation that is connected to the Internet via a wired network connection or a wireless network connection. The mobile network service 1320 can be a public or a private network such as an LAN or WAN network. The mobile network service 1320 can be wireless such as a cellular network including EDGE, 3G and 4G wireless cellular systems. The wireless mobile network service 1320 can also be Wi-Fi, Bluetooth, or any other wireless form of communication that is known.

The user's terminal, such as a mobile user terminal and a fixed user terminal, provides a mechanism to connect via the Internet to the cloud 1330 and to receive output from the cloud 1330, which is communicated and displayed at the user's terminal. In the cloud 1330, a cloud controller 1336 processes the request to provide users with the corresponding cloud services. These services are provided using the concepts of utility computing, virtualization, and service-oriented architecture.

In one implementation, the cloud 1330 is accessed via a user interface such as a secure gateway 1332. The secure gateway 1332 can for example, provide security policy enforcement points placed between cloud service consumers and cloud service providers to interject enterprise security policies as the cloud-based resources are accessed. Further, the secure gateway 1332 can consolidate multiple types of security policy enforcement, including for example, authentication, single sign-on, authorization, security token mapping, encryption, tokenization, logging, alerting, and API control. The cloud 1330 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 1340 that prepares and equips the cloud resources, such as the processing center 1334 and data storage 1338 to provide services to the users of the cloud 1330. The processing center 1334 can be a computer cluster, a data center, a main frame computer, or a server farm. In one implementation, the processing center 1334 and data storage 1338 are collocated.

Embodiments described herein can be implemented in conjunction with one or more of the devices described above with reference to FIGS. 9-13. Embodiments are a combination of hardware and software, and circuitry by which the software is implemented.

FIG. 14 illustrates an exemplary algorithmic flowchart for a method 1400 of repairing a communication route in a WSN. The hardware description above, exemplified by any one of the structural examples shown in FIG. 9, 10, or 11, constitutes or includes specialized corresponding structure that is programmed or configured to perform the algorithm illustrated in FIG. 14. For example, the algorithm shown in FIG. 14 may be completely performed by the circuitry included in the single device shown in FIG. 9 or 10, or the chipset as shown in FIG. 11, or the algorithm may be completely performed in a shared manner distributed over the circuitry of any plurality of the devices shown in FIG. 13.

Method 1400 includes recognizing via a routing protocol a link break within a data communication route between a pair of sensor nodes for a plurality of sensor nodes within the WSN in step S1410. Method 1400 also includes buffering incoming packets from a source node in step S1420, and propagating a RERR message of the link break to the plurality of sensor nodes within the WSN in step S1430. Method 1400 also includes building a bypass route around the link break of the data communication route towards a destination node in step S1440, and sending the buffered incoming packets to the destination node through the bypass route in step S1450.

With reference to FIG. 14, the steps of method 1400 are executed in WSN 1460, such as the WSN 800 and server 810 described herein. WSN 1460 includes a plurality of sensor nodes 1490, which are configured with a radio transceiver and circuitry for interfacing with one or more associated sensors. WSN 1460 also includes at least one gateway sensor node 1480 configured to receive sensor data from and forward instructions to the one or more sensor nodes. WSN 1460 also includes a server 1470 configured to control the WSN 1460 in conjunction with the gateway sensor node 1480. Server 1470 could be a separate structure from WSN 1460 or it could be integrated with WSN 1460. WSN 1460 also includes circuitry configured to execute the steps of method 1400. The circuitry is embodied throughout the WSN 1460, as well as within each of the server 1470, the gateway sensor node 1480, and the plurality of sensor nodes 1490.

Method 1400 can also include initiating a route discovery process by the source node subsequent to receiving the RERR message. The routing protocol can include AODV routing protocol, as well as Energy-Harvesting AODV routing protocol. Method 1400 can include setting a flag in the RERR message to prevent upstream nodes from invalidating an unreachable route. Method 1400 can also include building the bypass route by initiating a local route repair through neighboring nodes of the link break.

Embodiments described herein also include a non-transitory computer-readable medium having computer-readable instructions embodied thereon, that when executed by a computing device, performs the steps of method 1400.

An embodiment described herein includes a WSN having a plurality of sensor nodes that are configured with a radio transceiver and electronic circuitry for interfacing with one or more associated sensors. The WSN also includes a gateway sensor node configured to receive sensor data from and forward instructions to the one or more sensor nodes, and a server configured to control the WSN in conjunction with the gateway sensor node. The WSN also includes circuitry configured to recognize a link break within a data communication route of the WSN via a routing protocol, and buffer incoming packets from a source node. The circuitry is also configured to propagate a RERR message of the link break to the plurality of sensor nodes within the WSN, and build a bypass route around the link break of the data communication route towards a destination node. The circuitry is also configured to send the buffered incoming packets to the destination node through the bypass route.

In the WSN, the circuitry can be configured to initiate a route discovery process by the source node subsequent to receiving the RERR message. The routing protocol can include an AODV routing protocol. The routing protocol can also include an Energy-Harvesting AODV routing protocol. The circuitry can also be configured to set a flag in the RERR message to prevent upstream nodes from invalidating an unreachable route. The circuitry can also be configured to build the bypass route by initiating a local route repair through neighboring nodes of the link break.

Embodiments described herein have advantages over existing systems and methods of energy harvesting WSNs. For example, local repairs estimate a waiting time for recharging a faulty node to become active again. The route can be activated whether a new by-pass node is found or not. If the by-pass node has a better expected energy level during the waiting time, the route can keep using this node. Otherwise, it can revert back to the previous node.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative and not limiting thereof. The disclosure, including any readily discernible variants of the teachings herein defines in part, the scope of the foregoing claim terminology.

The invention claimed is:

1. A wireless sensor network (WSN), comprising:
   a plurality of sensor nodes, each configured with a radio transceiver and electronic circuitry for interfacing with one or more associated sensors;
   a gateway sensor node configured to receive sensor data from and forward instructions to the one or more sensor nodes;
   a server configured to control the WSN in conjunction with the gateway sensor node; and
   circuitry configured to
      recognize a link break within a data communication route of the WSN via a routing protocol;
      buffer incoming packets from a source node;
      propagate a route error (RERR) message of the link break to the plurality of sensor nodes within the WSN;
      build a bypass route around the link break of the data communication route towards a destination node; and
      send the buffered incoming packets to the destination node through the bypass route,
      wherein the circuitry is further configured to set a flag in the RERR message to prevent upstream nodes from invalidating an unreachable route.

2. The WSN of claim 1, wherein the circuitry is further configured to initiate a route discovery process by the source node subsequent to receiving the RERR message.

3. The WSN of claim 1, wherein the routing protocol includes an Ad hoc On demand Distance Vector (AODV) routing protocol.

4. The WSN of claim 3, wherein the routing protocol includes an Energy-Harvesting AODV routing protocol.

5. The WSN of claim 1, wherein the circuitry is further configured to build the bypass route by initiating a local route repair through neighboring nodes of the link break.

6. The WSN of claim 1, wherein the upstream nodes reset a route active timer upon receiving the RERR message having the set flag.

7. The WSN of claim 1, wherein the flag is set in the RERR message in response to a repair of the data communication route.

8. A method of repairing a communication route in a wireless sensor network (WSN), the method comprising:
   recognizing, via a routing protocol, a link break within a data communication route between a pair of sensor nodes for a plurality of sensor nodes within the WSN;
   buffering incoming packets from a source node;
   propagating a route error (RERR) message of the link break to the plurality of sensor nodes within the WSN;
   setting a flag in the RERR message to prevent upstream nodes from invalidating an unreachable route;
   building a bypass route around the link break of the data communication route towards a destination node; and
   sending the buffered incoming packets to the destination node through the bypass route,
   wherein the WSN includes circuitry configured to execute steps of the method,
      the plurality of sensor nodes are configured with a radio transceiver and circuitry for interfacing with one or more associated sensors,
      a gateway sensor node is configured to receive sensor data from and forward instructions to the one or more sensor nodes, and a server is configured to control the WSN in conjunction with the gateway sensor node.

9. The method of claim 8, further comprising:
initiating a route discovery process by the source node subsequent to receiving the RERR message.

10. The method of claim 8, wherein the routing protocol includes an Ad hoc On demand Distance Vector (AODV) routing protocol.

11. The method of claim 10, wherein the routing protocol includes an Energy-Harvesting AODV routing protocol.

12. The method of claim 8, further comprising:
building the bypass route by initiating a local route repair through neighboring nodes of the link break.

13. A non-transitory computer-readable medium having computer-readable instructions embodied thereon, that when executed by a computing device, performs a method of repairing a communication route in a wireless sensor network (WSN), the method comprising:
recognizing, via a routing protocol, a link break within a data communication route between a pair of sensor nodes for a plurality of sensor nodes within the WSN;
buffering incoming packets from a source node;
propagating a route error (RERR) message of the link break to the plurality of sensor nodes within the WSN;
setting a flag in the RERR message to prevent upstream nodes from invalidating an unreachable route;
building a bypass route around the link break of the data communication route towards a destination node; and
sending the buffered incoming packets to the destination node through the bypass route.

14. The non-transitory computer-readable medium of claim 13, the method further comprising:
initiating a route discovery process by the source node subsequent to receiving the RERR message.

15. The non-transitory computer-readable medium of claim 13, wherein the routing protocol includes an Ad hoc On demand Distance Vector (AODV) routing protocol.

16. The non-transitory computer-readable medium of claim 15, wherein the routing protocol includes an Energy-Harvesting AODV routing protocol.

17. The non-transitory computer-readable medium of claim 13, the method further comprising:
building the bypass route by initiating a local route repair through neighboring nodes of the link break.

* * * * *